United States Patent [19]

Ozawa et al.

[11] Patent Number: 5,104,572
[45] Date of Patent: Apr. 14, 1992

[54] AZO COMPOUND AND LIQUID CRYSTAL COMPOSITION CONTAINING THE SAME

[75] Inventors: Tetsuo Ozawa, Hadano; Hisayo Hosokai, Yokohama, both of Japan

[73] Assignee: Mitsubishi Kasei Corporation, Japan

[21] Appl. No.: 351,654

[22] Filed: May 15, 1989

[30] Foreign Application Priority Data

May 13, 1988 [JP] Japan .................... 63-116629

[51] Int. Cl.$^5$ .................. C09K 19/00; C09K 19/22; G02B 5/23; C07C 245/00
[52] U.S. Cl. .................. 252/299.1; 252/299.68; 252/585; 252/586; 534/831; 534/832
[58] Field of Search .............. 252/299.01, 299.1, 299.6, 252/299.68, 585, 586; 534/831, 832

[56] References Cited

FOREIGN PATENT DOCUMENTS

| | | |
|---|---|---|
| 080153 | 6/1983 | European Pat. Off. . |
| 144020 | 12/1985 | European Pat. Off. . |
| 341744 | 11/1989 | European Pat. Off. ............ 534/832 |
| 2644219 | 4/1978 | Fed. Rep. of Germany ... 252/299.6 |
| 2201158 | 8/1988 | United Kingdom . |

*Primary Examiner*—Robert L. Stoll
*Assistant Examiner*—Philip C. Tucker
*Attorney, Agent, or Firm*—Jordan B. Bierman

[57] ABSTRACT

A novel azo compound, which has a high dichroic ratio as well as a high solubility in liquid crystals, and a liquid crystal composition containing the same as disclosed. The liquid crystal composition enables an excellent and clear color display.

18 Claims, No Drawings

AZO COMPOUND AND LIQUID CRYSTAL COMPOSITION CONTAINING THE SAME

FIELD OF THE INVENTION

This invention relates to a novel azo compound and a liquid crystal composition containing said compound.

BACKGROUND OF THE INVENTION

There has been known a color display device wherein a liquid crystal composition in which a dyestuff compound is dissolved in liquid crystals is located between two electrodes so as to utilize the guest/host effect of said dyestuff compound and liquid crystals.

A dyestuff compound to be used in such a liquid crystal composition as described above should have a particularly high dichroic ratio as well as a high solubility in liquid crystals.

However we have found that conventional azo compounds do not always satisfy these requirements as a dyestuff compound to be used in a liquid crystal composition.

SUMMARY OF THE INVENTION

It is an object of the present invention to provide an azo compound which has a high dichroic ratio and a high solubility in liquid crystals as well as a liquid crystal composition which enables an excellent color display.

Under these circumstances, we have attempted to extend the molecular chain of an azo dyestuff in the longer direction via acetylene bonds. As a result, we have found a dyestuff having a particularly high dichroic ratio and a high solubility, thus completing the present invention.

Accordingly, the present invention provides an azo compound of the following general formula (I):

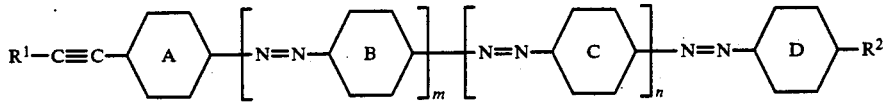

wherein $R^1$ represents an alkyl group or a

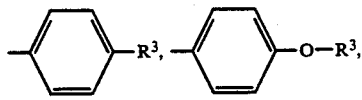

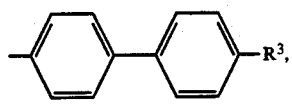

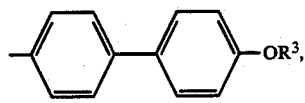

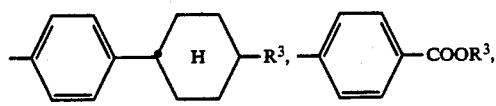

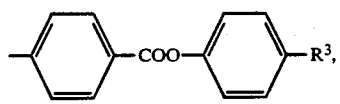

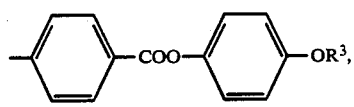

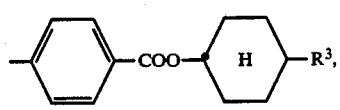

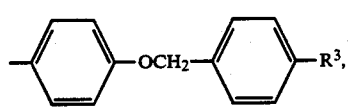

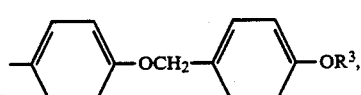

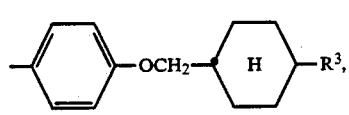

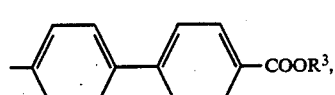

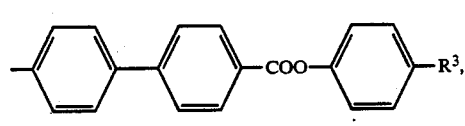

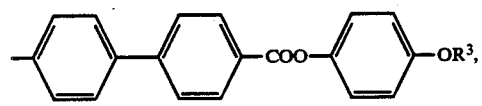

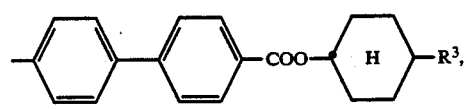

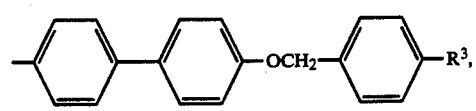

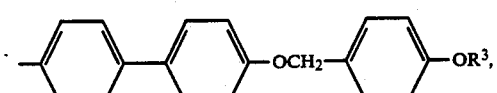

-continued

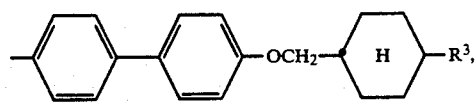

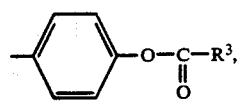

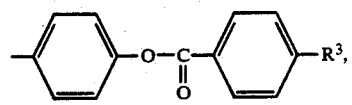

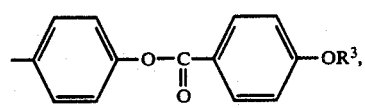

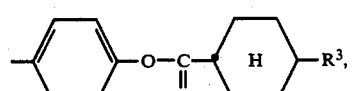

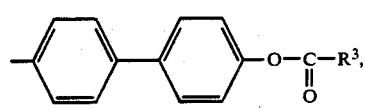

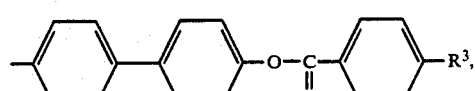

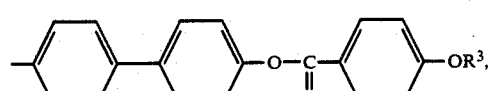

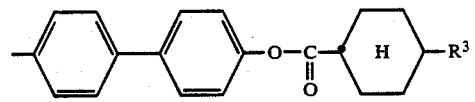

or

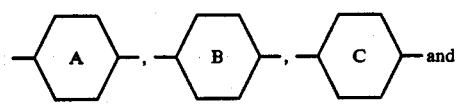

group (wherein $R^3$ represents an alkyl group);

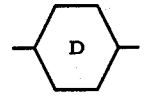 and

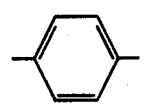

represent each

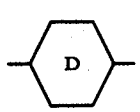

group optionally sugstituted with an alkyl group or a halogen atom,

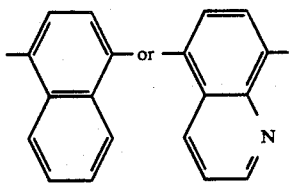

m and n are each 0 or 1; $R^2$ represents a $-OR^3$,

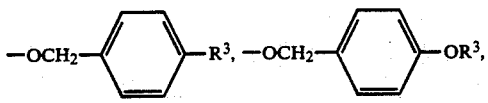

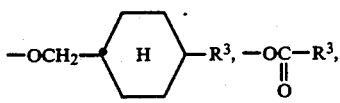

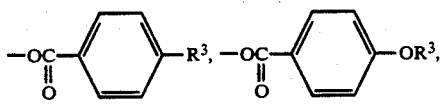

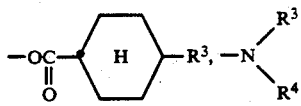

(wherein $R^3$ is as defined above and $R^4$ represents a hydrogen atom or an alkyl group),

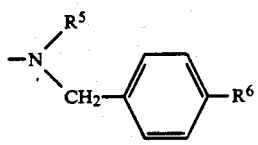

(wherein $R^5$ represents a hydrogen atom or an alkyl group and $R^6$ represents a hydrogen atom or an alkyl or alkoxy group),

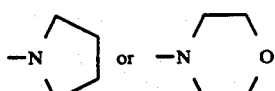

group; and an alkyl substituent in

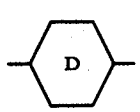

may bound to an alkyl group $R^3$, $R^4$ or $R^5$ in

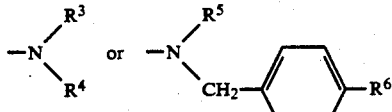

of the $R^2$ group to thereby form a nitrogen-containing aliphatic ring; and a liquid crystal composition containing said compound.

DETAILED DESCRIPTION OF THE INVENTION

Examples of the alkyl groups in $R^1$, $R^3$, $R^4$, $R^5$ and $R^6$ in the azo compound of the general formula (I) of the present invention include those carrying 1 to 16 carbon atoms, preferably 1 to 10 carbon atoms. Examples of the alkoxy group in $R^6$ include those carrying one to ten carbon atoms.

Examples of the halogen atoms in the optionally substituted

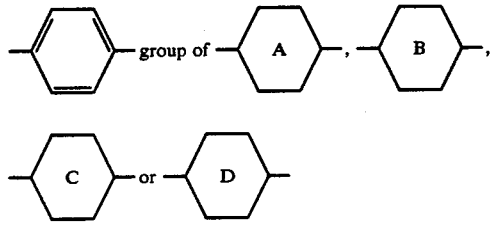

include chlorine and fluorine atoms, while examples of the alkyl group therein include lower alkyl groups such as methyl and ethyl groups. Examples of the alkyl-substituted phenyl group include

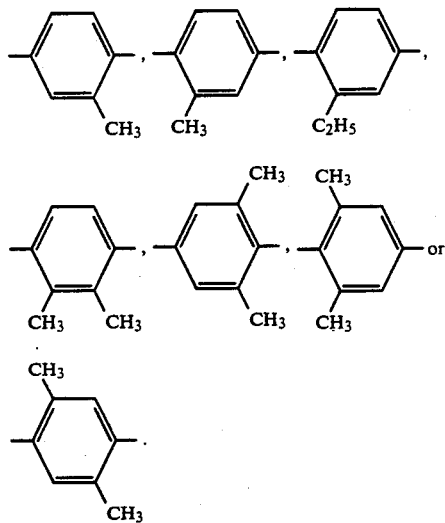

Examples of the nitrogen-containing aliphatic ring wherein the alkyl substituent in the

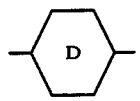

is bound to an alkyl group $R^3$, $R^4$ or $R^5$ in

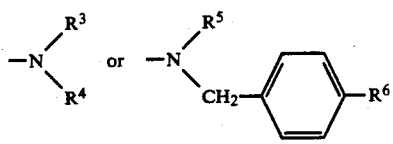

of the $R^2$ group include

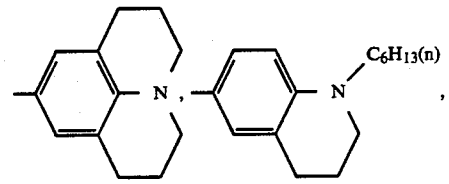

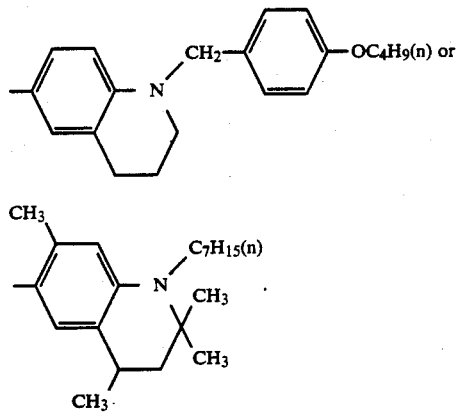

m and n represent each 0 or 1. The compound of the general formula (I) comprises, for example, the following monoazo compound, disazo compound or trisazo compound.

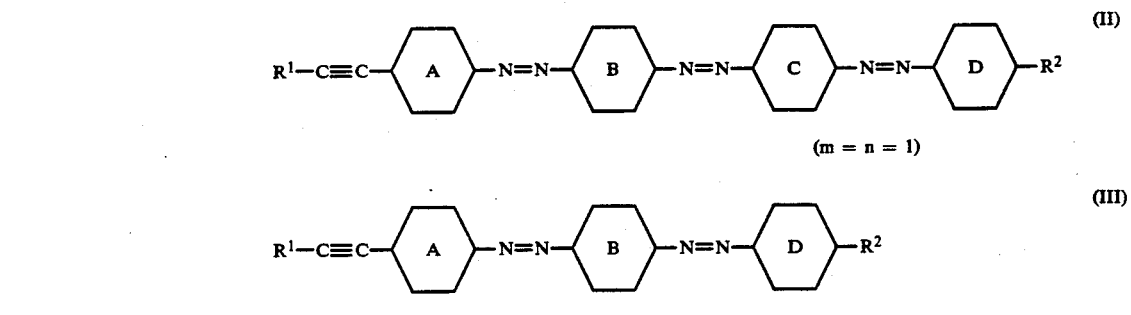

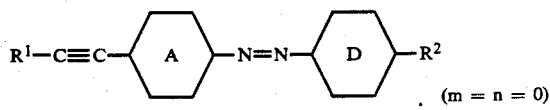
(m = n = 0)

wherein $R^1$, $R^2$,

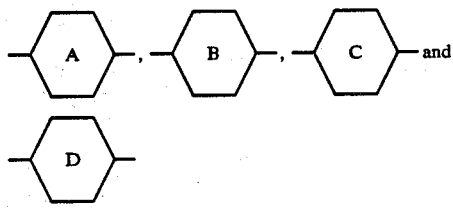

are as defined in the above general formula (I).

In the compound of the general formula (II), the substituent

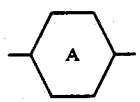

preferably represents a

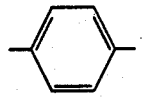

group; the substituent

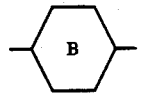

preferably represents a

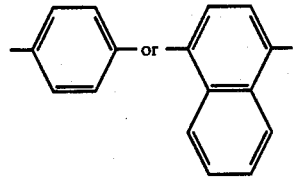

group; the substituent

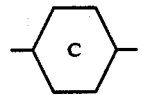

preferably represents a (IV)

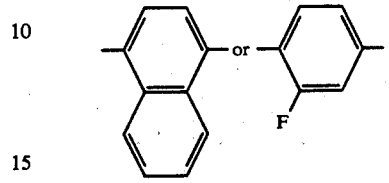

group; and the substituent

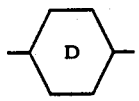

preferably represents a

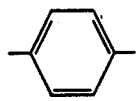

optionally substituted with a methyl group or a fluorine atom or

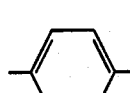

group. The R' preferably represents an alkyl,

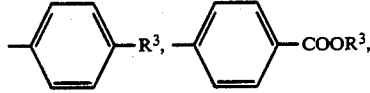

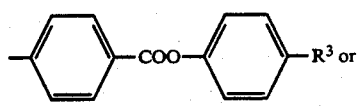

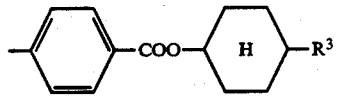

group wherein $R^3$ represents an alkyl group. The group $R^2$ preferably represents an

wherein $R^3$ and $R^4$ represent each an alkyl group or an

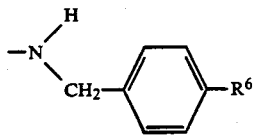

wherein $R^6$ represents an alkyl or alkoxy group. It is further preferable that the

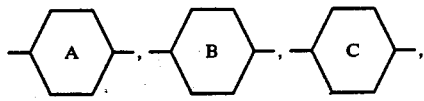

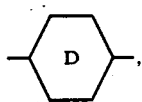

$R^1$ and $R^2$ represent each the preferable group as cited above. When $R^2$ is an

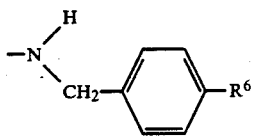

group, it is preferable, from the viewpoint of solubility, that $R^6$ is an alkyl group.

In the disazo compound of the general formula (III), the substituent

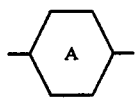

preferably represents a

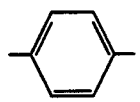

group optionally substituted with an alkyl group; the substituent

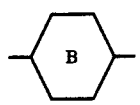

preferably represents a

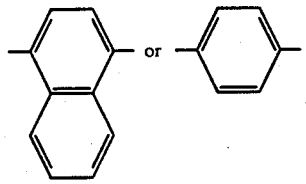

group optionally substituted with an alkyl group; the substituent

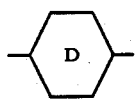

preferably represents a

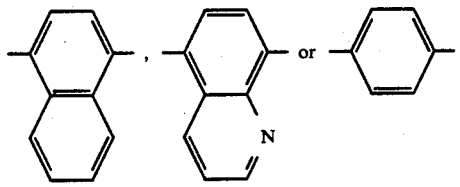

group optionally substituted with an alkyl group; $R^1$ preferably represents an alkyl,

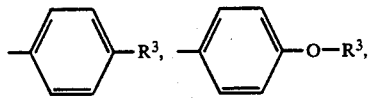

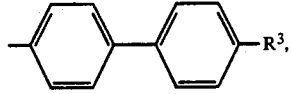

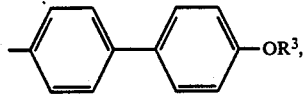

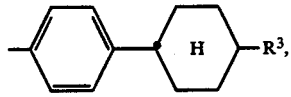

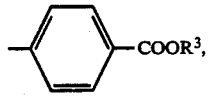

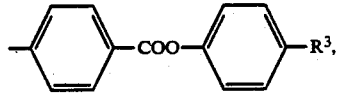

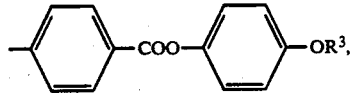

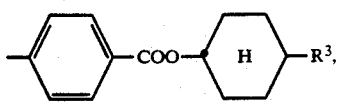

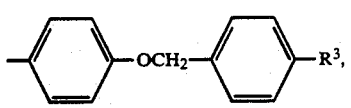

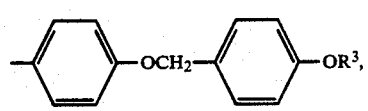

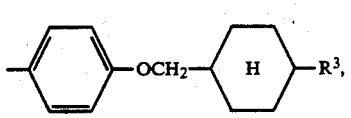

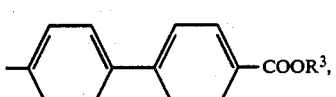

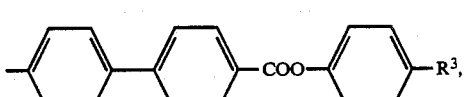

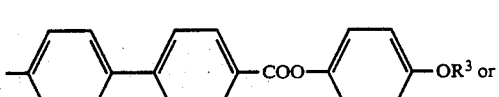

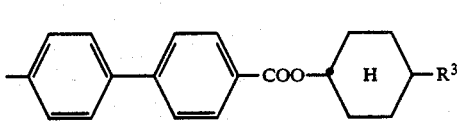

group (wherein $R^3$ represents an alkyl group); and $R^2$ preferably represents a

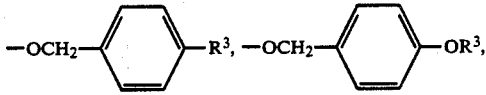

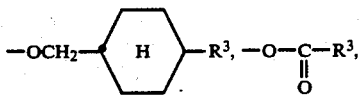

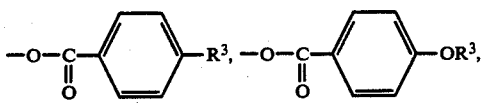

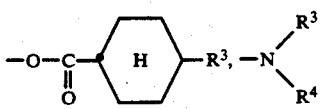

(wherein $R^3$ and $R^4$ represent each an alkyl group) or

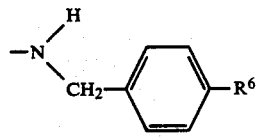

group (wherein $R^6$ represents a hydrogen atom or an alkyl or alkoxy group).

The disazo compound of the general formula (III) may be roughly classified into the following three types (1), (2) and (3) depending on various factors including readiness of the preparation, availability of starting materials, tone, light-resistance, order parameter and color density.

(1) A compound of the general formula (III) wherein

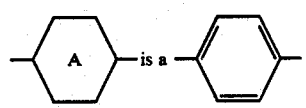

group optionally substituted with an alkyl group;

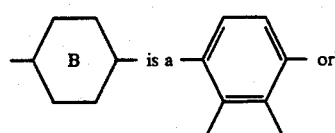

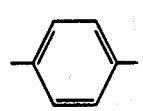

group optionally substituted with an alkyl group;

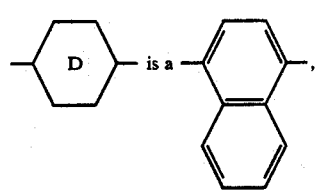

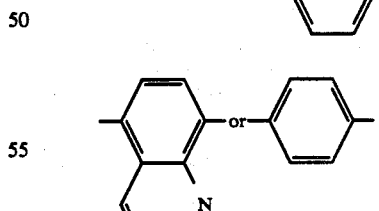

group optionally substituted with an alkyl group; $R^1$ is an alkyl,

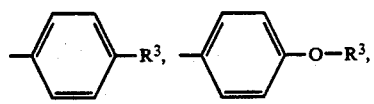

-continued
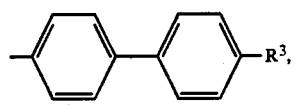
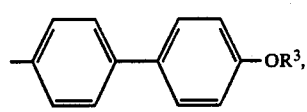
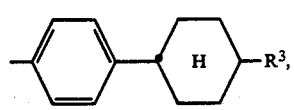
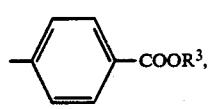
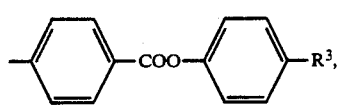
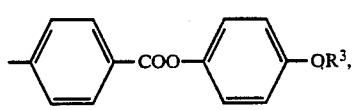
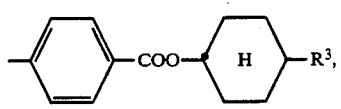
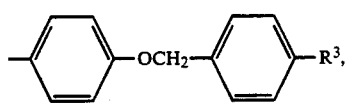
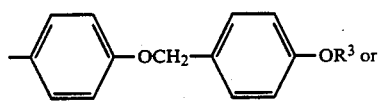
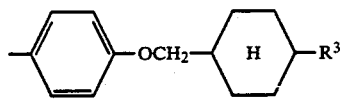
group (wherein $R^3$ is an alkyl group); $R^2$ is an
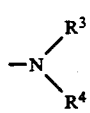
(wherein $R^3$ and $R^4$ represent each an alkyl group) or
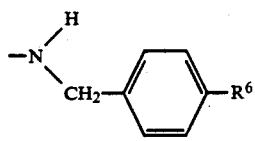
group (wherein $R^6$ represents a hydrogen atom or an alkyl or alkoxy group). It is particularly preferable that
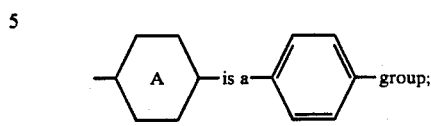
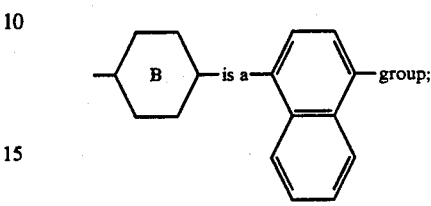
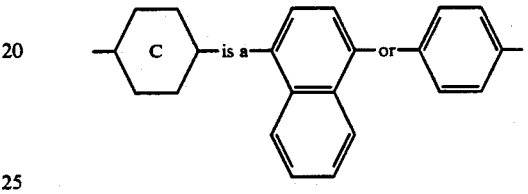
group optionally substituted with an alkyl group; $R^1$ is a
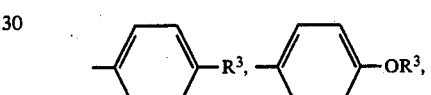
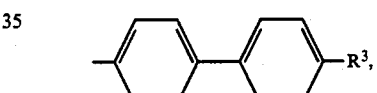
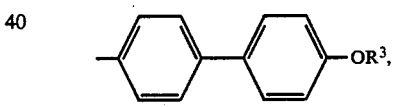
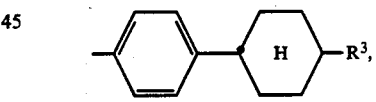
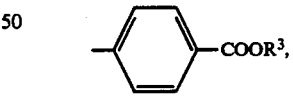
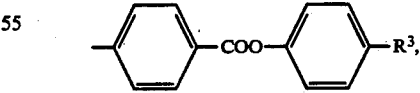
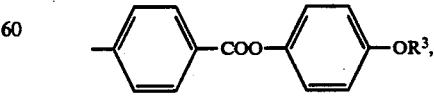
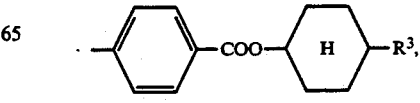

group ($R^3$ is an alkyl group); and $R^2$ is an

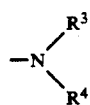

(wherein $R^3$ and $R^4$ represent each an alkyl group) or

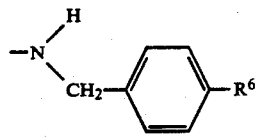

group (wherein $R^6$ is an alkyl or alkoxy group).

(2) A compound of the general formula (III) wherein

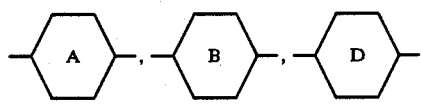

and $R^1$ are as defined in (1); while $R^2$ represents a

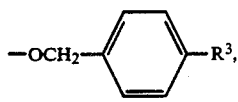

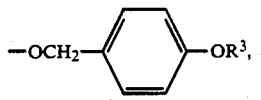

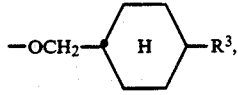

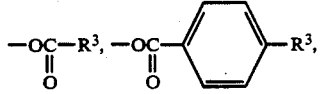

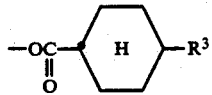

group (wherein $R^3$ is an alkyl group). It is particularly preferable that

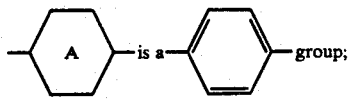

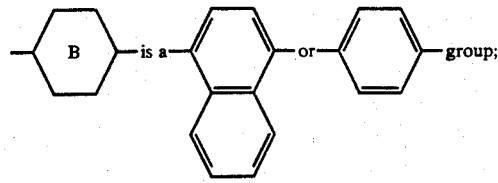

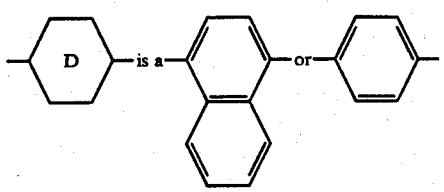

group optionally substituted with an alkyl group; $R^1$ is a

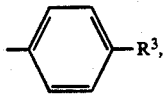

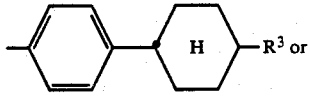

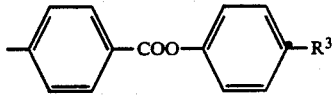

group (wherein $R^3$ is an alkyl group); and $R^2$ is a

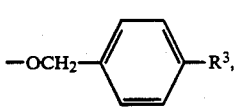

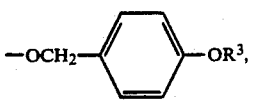

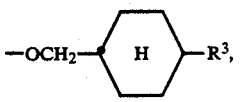

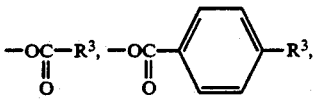

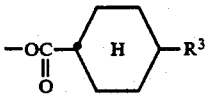

group (wherein $R^3$ is an alkyl group).

(3) A compound of the general formula (III) wherein

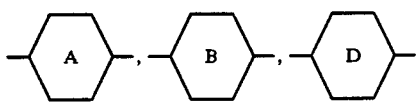

and R² are as defined in (1); while R¹ is a

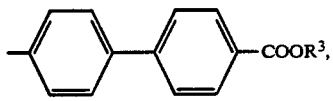

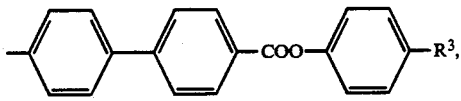

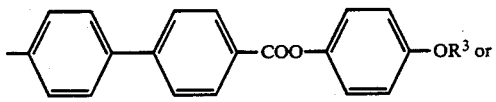

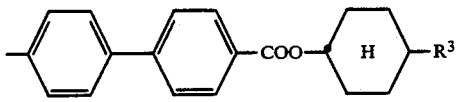

group (wherein R³ is an alkyl group). It is particularly preferable that

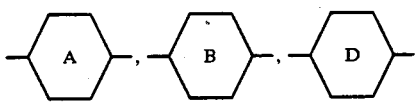

and R² are the preferable ones as defined in (1), while R¹ is a

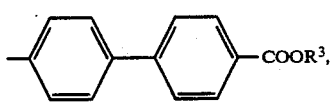

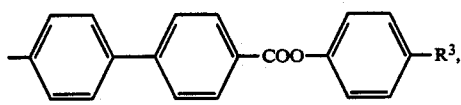

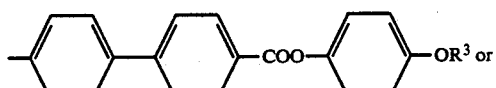

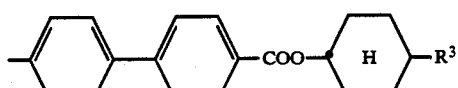

group (wherein R³ is an alkyl group).

In the compound represented by the general formula (IV),

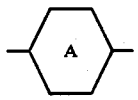

preferably represents a

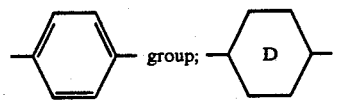

preferably represents a

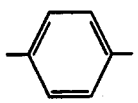

group; R¹ preferably represents a

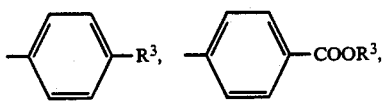

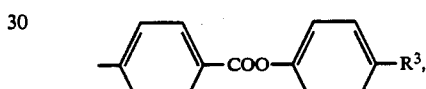

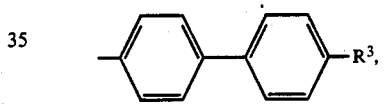

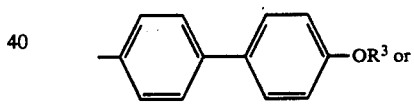

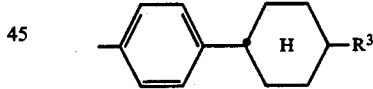

group (wherein R³ is an alkyl group); and R² preferably represents an

(wherein R³ and R⁴ represent each an alkyl group) or

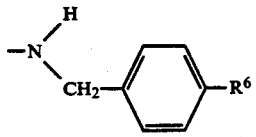

group
(wherein R⁶ is a hydrogen atom or an alkyl or alkoxy group). It is further preferable that

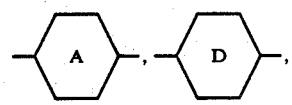

R[1] and R[2] represent each the preferable group as cited above. When R[2] is a

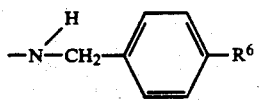

group, it is particularly preferable that R[6] is an alkyl or alkoxy group, still preferably an alkyl group.

The compound of the general formula (I) may be synthesized by, for example, the following process A or B.

Process A:

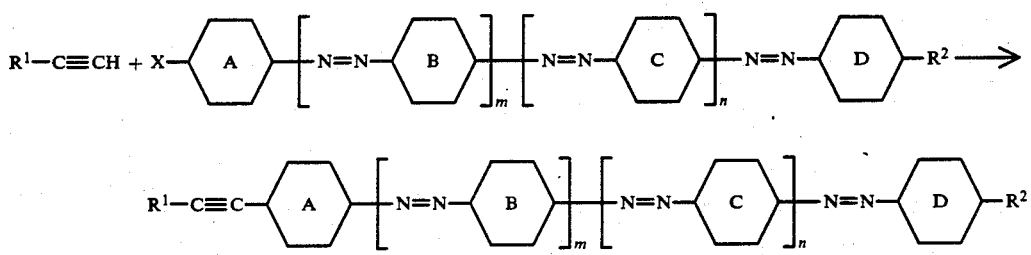

Process B:

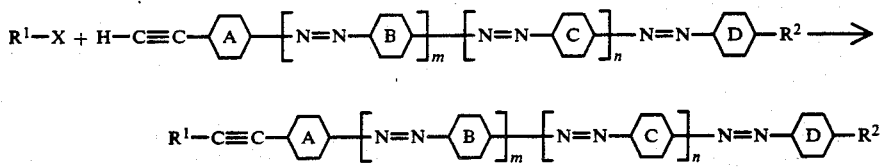

wherein R[1],

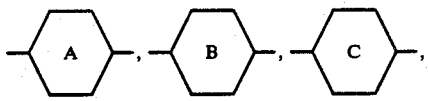

R[2], m and n are as defined in the above general formula (I); and

X represents a halogen atom such as a bromine or iodine atom.

Either the process A or process B may be carried out by using a palladium catalyst such as dichlorobis(triphenylphosphine) palladium or palladium acetate optionally together with a solvent such as benzene, toluene, chlorobenzene or o-dichlorobenzene in the presence of, for example, diethylamine, triethylamine or tri-n-butylamine at a temperature of 0° to 150° C., preferably 20° to 100° C.

The azo compound of the present invention may be mixed with various liquid crystals to thereby give a liquid crystal composition.

As the liquid crystals, either nematic, cholesteric or smectic ones may be employed.

The nematic liquid crystals to be used in the present invention may be selected from those of a considerably wide range so long as they are present in a nematic state within a wide temperature range. These nematic liquid crystals may be converted into a cholesteric state by adding an optically active substance, which will be described hereinafter, thereto. Examples of the nematic liquid crystals include those shown in Table 1 as well as derivatives thereof.

TABLE 1

| No. | Type | Example |
|---|---|---|
| 1. | Cyclohexylcyclohexane | R'—⟨H⟩—⟨H⟩—X' |
| 2. | Phenylcyclohexane | R'—⟨H⟩—⟨⟩—X' |

TABLE 1-continued

| No. | Type | Example |
|---|---|---|
| 3. | Biphenyl | R'—⟨C6H4⟩—⟨C6H4⟩—X' |
| 4. | Terphenyl | R'—⟨C6H4⟩—⟨C6H4⟩—⟨C6H4⟩—X' |
| 5. | Cyclohexylcyclohexanoate | R'—⟨H⟩—COO—⟨H⟩—X' |
| 6. | Phenylcyclohexylcarboxylate | R'—⟨H⟩—COO—⟨C6H4⟩—X' |
| 7. | Ester | R'—⟨C6H4⟩—COO—⟨C6H4⟩—X' |
| 8. | Diester | R'—⟨C6H4⟩—COO—⟨C6H4⟩—COO—⟨C6H4⟩—X' <br> X'—⟨C6H4⟩—COO—⟨C6H4⟩—COO—⟨C6H4⟩—R' |
| 9. | Biphenylcyclohexylcarboxylate | R'—⟨H⟩—COO—⟨C6H4⟩—⟨C6H4⟩—X' |
| 10. | Biphenyl ester | R'—⟨C6H4⟩—⟨C6H4⟩—COO—⟨C6H4⟩—X' <br> X'—⟨C6H4⟩—⟨C6H4⟩—COO—⟨C6H4⟩—R' |
| 11. | Thioester | R'—⟨C6H4⟩—COS—⟨C6H4⟩—X' |
| 12. | Schiff | R'—⟨C6H4⟩—CH=N—⟨C6H4⟩—X' <br> X'—⟨C6H4⟩—CH=N—⟨C6H4⟩—R' |

TABLE 1-continued
| No. | Type | Example |
|---|---|---|
| 13. | Pyrimidine | 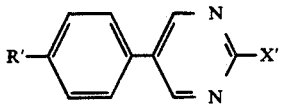 |
| | | 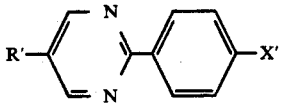 |
| | | 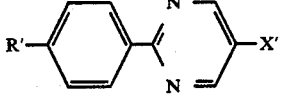 |
| | | 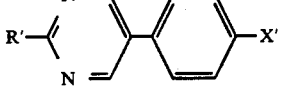 |
| 14. | Dioxane | 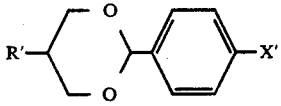 |
| 15. | Cyclohexyl methyl ether | 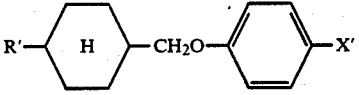 |
| | | 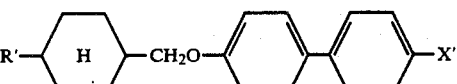 |
| 16. | Cinnamonitrile | 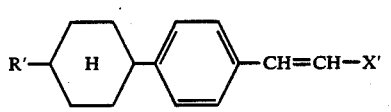 |
| 17. | Ethane | 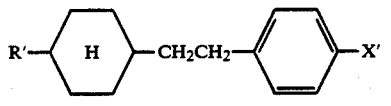 |
| | | 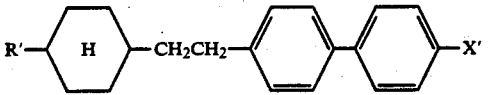 |
| | | 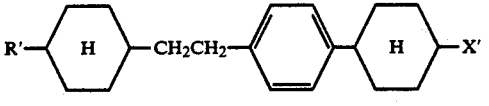 |
| 18. | Dicyanophenyl ester | 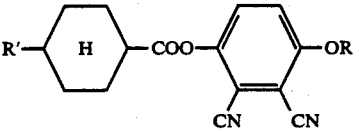 |

TABLE 1-continued

| No. | Type | Example |
|---|---|---|

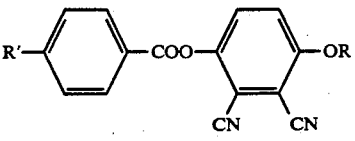

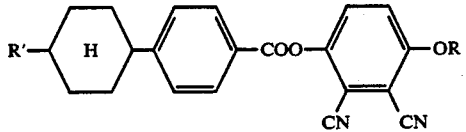

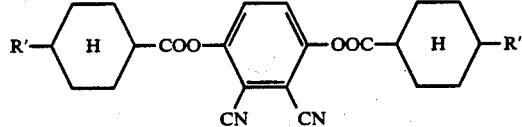

In the above Table 1, R' represents an alkyl or alkoxy group; R represents an alkyl group; and X' represents an alkyl, alkoxy, nitro or cyano group or a halogen atom.

Each liquid crystal in the Table 1 has a positive dielectric anisotropy. However known ester, azoxy, azo, Schiff, pyrimidine, diester or biphenyl ester type liquid crystals having a negative dielectric anisotropy may be mixed with a liquid crystal of a positive dielectric anisotropy to thereby give a liquid crystal composition of a positive dielectric anisotropy as the whole. Further liquid crystals of a negative dielectric anisotropy may be used as such by appropriately selecting the construction of a display and a driving system.

Either one of the liquid crystals shown in Table 1 or a mixture thereof may be used as the host liquid crystal substance of the liquid crystal composition according to the present invention. For example, liquid crystals ZLI-1132 or ZLI-1565 (mfd. by Merck Co., Inc.) or E-7 (mfd. by British Drug House) may be used therefor.

These nematic liquid crystals may be converted into a cholesteric state by adding an optically active substance described below.

Examples of the optically active substance to be used in the liquid crystal composition of the present invention include chiralnematic compounds obtained by introducing an optically active group, for example, 2-methylbutyl, 3-methylbutoxy, 3-methylpentyl, 3-methylpentoxy, 4-methylhexyl or 4-methylhextoxy group into a nematic liquid crystal. Further other optically active substances described in Japanese Patent Laid-Open No. 45546/1976, for example, alcohol derivatives such as l-menthol or d-borneol; ketone derivatives such as d-camphor or 3-methylcyclohexane; carboxylic acid derivatives such as d-citronellic acid or l-camphoric acid; aldehyde derivatives such as d-citronellal; alkene derivatives such as d-linonene; and other amine, amide and nitrile derivatives may be employed therefor.

Examples of the smectic liquid crystals to be used in the present invention include smectic A liquid crystals and smectic chiral C liquid crystals.

The content of azo compound in the liquid crystal composition of the present invention depends on the kinds of the liquid crystal or colors which the liquid crystal composition is going to show and is decided experimentally.

In the application of the liquid crystal composition of the present invention to a liquid crystal display device, a known liquid crystal display device may be used. Namely, a common display device comprises transparent electrodes of an arbitrary pattern located on two glass base plates, at least one of which is transparent. These glass plates are parallelly located in such a manner as that the electrodes face with each other via an appropriate spacer. The gap of the display device thus formed is determined by the spacer. From a practical viewpoint, a device gap of 1 to 100 $\mu$m, in particular, 2 to 50 $\mu$m is preferable.

The novel azo compound of the present invention shows a high dichroic ratio and a high solubility in liquid crystals. A liquid crystal composition containing said compound enables an excellent color display.

To further illustrate the present invention, and not by way of limitation, the following examples will be given.

Now an order parameter showing dichroism will be briefly described. The order parameter (S) of a dyestuff compound is experimentally determined by the following equation:

$$(S) = (A_\| - A_\perp)/(A_\| + 2A_\perp).$$

In the above equation, $A_\|$ and $A_\perp$ respectively represent the absorbances of the dyestuff compound for parallelly and vertically polarized lights to the alignment direction of the liquid crystal.

The order parameter (S) means the display contrast of a guest/host type liquid crystal device. The degree of residual tone in the white portion would decrease, which enables a light and distinct display of a clear contrast, as the value (S) theoretically approaches 1.

EXAMPLE 1

Synthesis of a compound of a formula

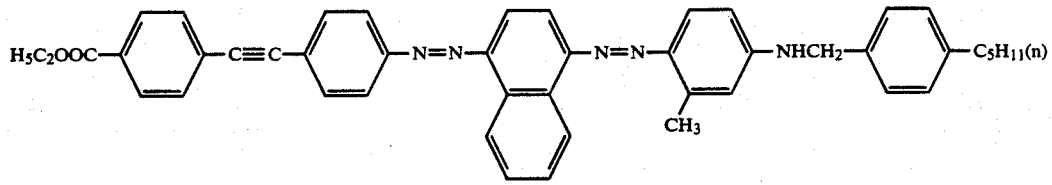

0.80 g of a compound of a formula:

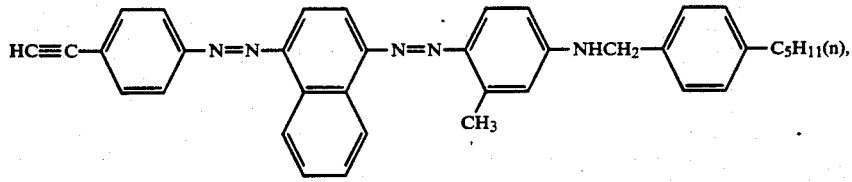

55 mg of cuprous iodide, 0.81 g of ethyl p-iodobenzoate and 0.88 g of triethylamine were added to 100 ml of o-dichlorobenzene. The resulting mixture was heated to 50° C. under a nitrogen gas stream. 30 mg of dichlorobis(triphenylphosphine) palladium and 23 mg of triphenylphosphine were added thereto and the obtained mixture was further stirred at 50° C. for three hours. The o-dichlorobenzene was distilled off under reduced pressure and the residue was purified by column chromatography by using silica gel as a carrier and chloroform as a solvent. Thus 0.70 g of the aimed compound was obtained (m.p.: 178°–179° C.).

The azo compound (dyestuff compound) of the present invention thus obtained was added to a liquid crystal mixture ZLI-1565 (mfd. by Merck Co., Inc.) and heated to 70° C. or above. When the liquid crystals became an isotropic liquid, the mixture was thoroughly stirred and then cooled by allowing to stand. After repeating this procedure, the above dyestuff compound was dissolved therein.

The liquid crystal composition of the present invention thus obtained was introduced into a device of a gap of 10 μm, which comprised transparent electrodes and two glass plates. On the surface of each glass plate to be contacted with said liquid crystals, a polyamide resin had been applied and cured, followed by homogeneously aligning by rubbing. When no voltage was applied to the device thus aligned, the abovementioned liquid crystals showed a homogeneous alignment and the dyestuff compound molecules also showed the same alignment as that of the host liquid crystals.

The absorption spectra of the guest/host type device thus obtained were determined by using parallelly and vertically polarized lights to the alignment direction of the liquid crystal molecules. Then the maximum absorption wavelength of the dyestuff compound for each polarized light was determined. At the determination of the absorbance of the dyestuff compound, the data were corrected depending on the absorbances of the host liquid crystals and glass plates and on the reflection loss of the device.

The order parameter (S) was calculated with the use of the $A\parallel$ and $A\perp$ to each polarized light according to the abovementioned equation:

$$(S) = (A\parallel - A\perp)/(A\parallel + 2A\perp)$$

Table 2-1 shows the results.

EXAMPLE 2

Synthesis of a compound of formula

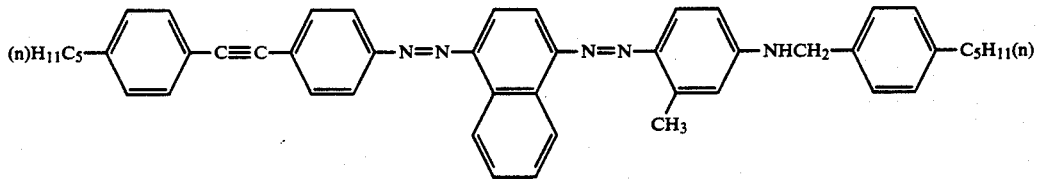

1.0 g of a compound of formula:

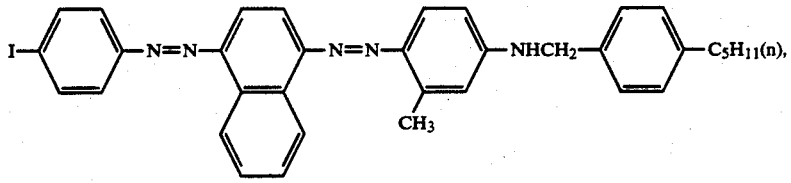

60 mg of cuprous iodide, 0.53 g of a compound of formula:

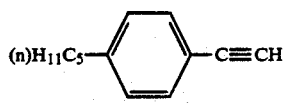

and 0.95 g of triethylamine were added to 100 ml of o-dichlorobenzene. The resulting mixture was heated to 50° C. under a nitrogen gas stream. Then 34 mg of dichlorobis(triphenylphosphine) palladium and 30 mg of triphenylphosphine were added thereto. The obtained mixture was further stirred at 50° C. for three hours. The reaction mixture was then treated in the same manner as the one described in Example 1. Thus 0.90 g of the aimed compound was obtained (m.p.: 126° to 127° C.).

By using the azo compound thus obtained, a guest-/host device was formed in the same manner as the one described in Example 1. The maximum absorbance wavelength and order parameter (S) were calculated. Table 2-1, No. 2 shows the results.

EXAMPLE 3

Synthesis of a compound of formula

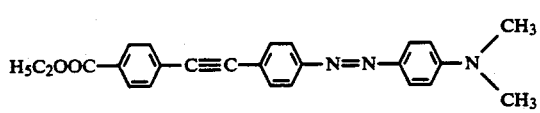

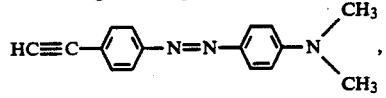

11 mg of cuprous iodide, 0.16 g of ethyl p-iodobenzoate, 0.31 g of tri-n-butylamine, 6 mg of dichlorobis(triphenylphosphine) palladium and 4 mg of triphenylphosphine were added to 70 ml of o-dichlorobenzene. The resulting mixture was stirred at 50° C. for three hours under a nitrogen gas stream. The reaction mixture was then treated in the same manner as the one described in Example 1. Thus 0.60 g of the aimed compound was obtained (m.p.: 200° to 201° C.).

By using the azo compound thus obtained, a guest-/host device was formed in the same manner as the one described in Example 1. The maximum absorbance wavelength and order parameter (S) were calculated. Table 2-1, No. 31 shows the results.

EXAMPLE 4

Synthesis of a compound of formula

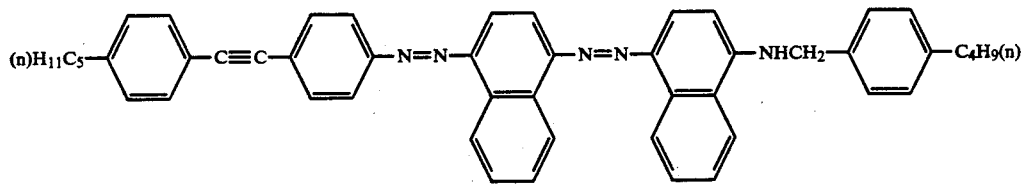

The procedure of Example 2 was repeated except that 1.0 g of the compound of formula:

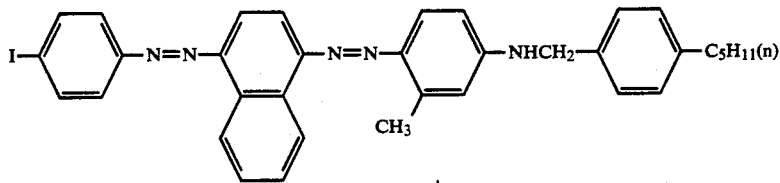

was substituted with 1.2 g of a compound of a formula:

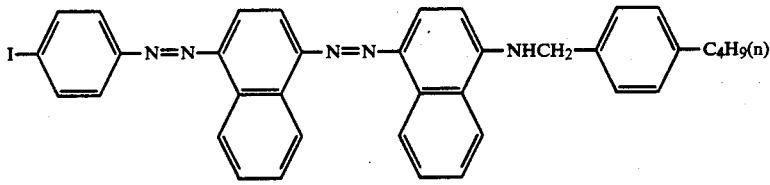

to thereby give 0.9 g of the aimed compound (m.p.: 196° to 197° C.).

By using the azo compound thus obtained, a guest-/host device was formed in the same manner as the one described in Example 1. The maximum absorbance wavelength and order parameter (S) were calculated. Table 2-1, No. 43 shows the results.

EXAMPLE 5

The compounds shown in the following Tables 2-1 to 2-4 were prepared in the same manner as the one described in Example 1 or 2. The order parameter (S) and the maximum absorbance wavelength of each compound were determined. Tables 2-1 to 2-4 show the results.

TABLE 2-1

$R^1-C\equiv C$ —[A]— N=N —[B]— N=N —[D]— $R^2$ (m=1, n=0 in general formula [I])

| No. | $R^1-$ | A | B | D | $-R^2$ | λmax (n.m.) | Order parameter (S) |
|---|---|---|---|---|---|---|---|
| 1 | H5C2OOC—⌬— | ⌬ (phenyl) | naphthyl | ⌬-CH3 (tolyl) | -N(H)-CH2-⌬-C5H11(n) | 539 | 0.82 |
| 2 | (n)H11C5—⌬— | " | " | " | -N(H)-CH2-⌬-C5H11(n) | 539 | 0.82 |
| 3 | (n)H7C3—⌬— | " | " | ⌬ (phenyl) | -N(CH3)(C2H5) | 543 | 0.80 |
| 4 | H9C4—⌬—OOC—⌬— | " | " | " | -N(CH3)-CH2-⌬-OC7H15(n) | 540 | 0.81 |
| 5 | (n)H11C5—⬡(H)—⌬— | ⌬ | naphthyl | ⌬-CH3 | -N(H)-CH2-⌬-C4H9(n) | 539 | 0.84 |

TABLE 2-1-continued
R¹—C≡C—[A]—N=N—[B]—N=N—[D]—R²
(m=1, n=0 in general formula [I])
| No. | R¹— | A | B | D | —R² | λmax (n.m.) | Order parameter (S) |
|---|---|---|---|---|---|---|---|
| 6 | 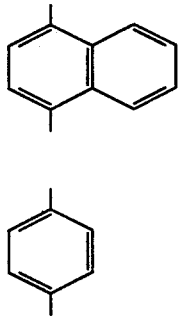 | 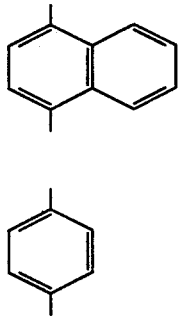 | 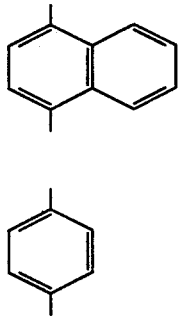 | 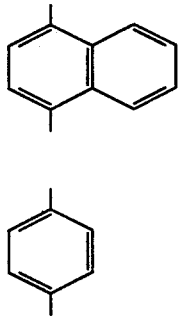 | 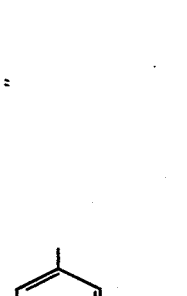 | 538 | 0.80 |
| 7 | 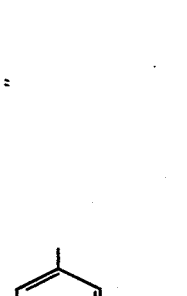 | " | " | 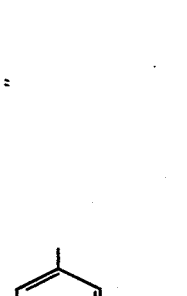 | 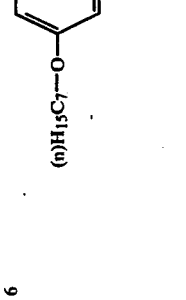 | 525 | 0.79 |
| 8 | 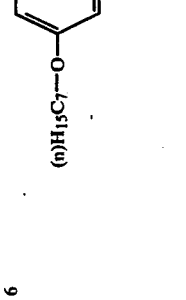 | 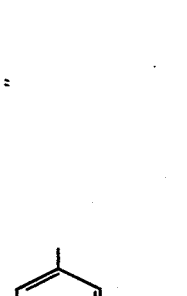 | 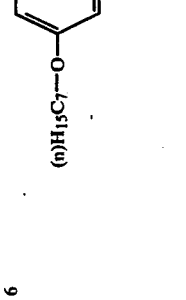 | 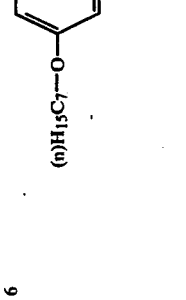 | 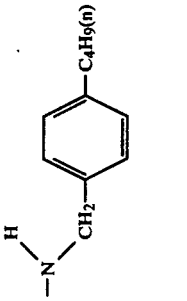 | 528 | 0.84 |
| 9 | 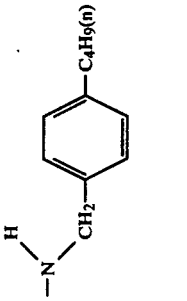 | 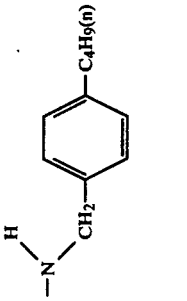 | 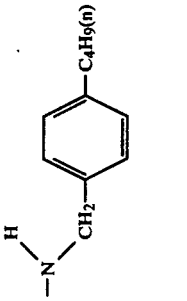 |  | CH₃\N—C₃H₇(n) | 518 | 0.80 |

TABLE 2-1-continued $R^1-C\equiv C-\underset{A}{\bigcirc}-N=N-\underset{B}{\bigcirc}-N=N-\underset{D}{\bigcirc}-R^2$ (m=1, n=0 in general formula [I])

| No. | R¹— | A | B | D | —R² | λmax (n.m.) | Order parameter (S) |
|---|---|---|---|---|---|---|---|
| 10 | (n)H₁₅C₇— | phenyl | 2,3-dimethylphenyl | 3-methylphenyl | —CH₂—NH—C₆H₄—C₆H₁₃(n) | 520 | 0.80 |
| 11 | (n)H₁₁C₅—phenyl | naphthyl | 2-methylphenyl | phenyl | —N(CH₃)(C₂H₅) | 533 | 0.79 |
| 12 | (n)H₉C₄—phenyl | phenyl | naphthyl | N-methyl-tetrahydroquinolinyl | —CH₂—C₆H₄—OC₄H₉(n) | 542 | 0.80 |
| 13 | (n)H₇C₃—phenyl | " | " | phenyl | pyrrolidinyl | 545 | 0.79 |

TABLE 2-1-continued $R^1-C\equiv C$—(A)—N=N—(B)—N=N—(C)—(D)—R²

(m=1, n=0 in general formula [I])

| No. | R¹— | A | B | D | —R² | λmax (n.m.) | Order parameter (S) |
|---|---|---|---|---|---|---|---|
| 14 | (n)H₁₁C₅O—⟨phenyl⟩—OOC—⟨phenyl⟩— | ⟨phenyl⟩ | ⟨phenyl⟩ | ⟨phenyl-CH₃⟩ | —N(H)—CH₂—⟨phenyl⟩—C₃H₇(n) | 539 | 0.83 |
| 15 | (n)H₁₅C₇O—⟨phenyl⟩—⟨phenyl⟩— | " | ⟨naphthyl⟩ | ⟨phenyl-CH₃⟩ | —N(H)—CH₂—⟨phenyl⟩—C₄H₉(n) | 539 | 0.83 |
| 16 | (n)H₉C₄—⟨cyclohexyl H⟩—OOC—⟨phenyl⟩— | " | " | " | —N(H)—CH₂—⟨phenyl⟩—OC₄H₉(n) | 539 | 0.83 |
| 17 | (n)H₇C₃—⟨phenyl⟩—CH₂O—⟨phenyl⟩— | " | " | " | —N(CH₃)—C₅H₁₁(n) | 544 | 0.82 |
| 18 | (n)H₁₅C₇O—⟨phenyl⟩—CH₂O—⟨phenyl⟩— | " | " | ⟨phenyl-CH₃⟩ | —N(CH₃)—C₇H₁₅(n) | 545 | 0.81 |

TABLE 2-1-continued $$R^1-C\equiv C-\underset{A}{\bigcirc}-N=N-\underset{B}{\bigcirc}-N=N-\underset{D}{\bigcirc}-R^2$$

(m=1, n=0 in general formula [I])

| No. | R¹– | A | B | D | –R² | λmax (n.m.) | Order parameter (S) |
|---|---|---|---|---|---|---|---|
| 19 | (n)H₉C₄–[cyclohexyl]–CH₂O–[phenyl]– | [phenyl] | [cyclohexyl] | [cyclohexyl] | morpholino (N–CH₂CH₂–O–CH₂CH₂) | 540 | 0.80 |
| 20 | (n)H₁₁C₅–[biphenyl]– | " | [naphthyl] | [quinolinyl] | –NH–CH₂–[phenyl]–C₄H₉(n) | 526 | 0.82 |
| 21 | (n)H₇C₃–[cyclohexyl]–[phenyl]– | " | " | [phenyl] | –NH–CH₂–[phenyl]–C₅H₁₁(n) | 526 | 0.82 |
| 22 | (n)H₉C₄–[phenyl]– | " | " | " | –O–CO–[phenyl]–C₆H₁₃(n) | 431 | 0.79 |
| 23 | (n)H₇C₃–[phenyl]–OOC–[phenyl]– | " | " | " | –O–CO–[cyclohexyl]–C₄H₉(n) | 435 | 0.80 |

TABLE 2-1-continued $R^1-C\equiv C-\underset{A}{\bigcirc}-N=N-\underset{B}{\bigcirc}-N=N-\underset{D}{\bigcirc}-R^2$ (m=1, n=0 in general formula [I])

| No. | $R^1-$ | A | B | D | $-R^2$ | λmax (n.m.) | Order parameter (S) |
|---|---|---|---|---|---|---|---|
| 24 | H₅C₂OOC–⌬– | ⬡ | ⬡ | ⬡ | –O–C₇H₁₅(n) | 450 | 0.78 |
| 25 | (n)H₇C₃–⌬– | " | naphthalene | ⬡ | –OCH₂–⌬–C₄H₉(n) with H | 445 | 0.80 |
| 26 | (n)H₁₅C₇– | " | " | naphthalene | –OCH₂–⌬–OC₆H₁₃(n) | 455 | 0.78 |
| 27 | (n)H₁₁C₅–⌬– | " | " | ⌬–CH₃ | –O–C(=O)–C₇H₁₅(n) | 435 | 0.78 |
| 28 | (n)H₁₁C₅–⬡–⌬– (H) | " | ⬡ | ⬡ | –OCH₂–⌬–C₄H₉(n) | 408 | 0.79 |

TABLE 2-1-continued
$R^1-C\equiv C-\underset{A}{\bigcirc}-N=N-\underset{B}{\bigcirc}-N=N-\underset{D}{\bigcirc}-R^2$
(m=1, n=0 in general formula [I])
| No. | R¹— | A | B | D | —R² | λmax (n.m.) | Order parameter (S) |
|---|---|---|---|---|---|---|---|
| 29 | (n)H₁₁C₅OOC—⟨⟩— | ⟨⟩ | ⟨⟩-CH₃ | ⟨⟩ | —OC₇H₁₅(n) | 410 | 0.78 |
Note: 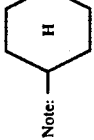— shows a trans-substituted compound.

TABLE 2-2

$$R^1-C\equiv C-\underset{A}{\bigcirc}-N=N-\underset{D}{\bigcirc}-R^2$$

(m = n = 0 in general formula [I])

| No. | R¹— | A | D | —R² | λmax (n.m.) | Order parameter (S) |
|---|---|---|---|---|---|---|
| 30 | (n)H₁₁C₅—⟨phenyl⟩— | ⟨phenyl⟩ | ⟨phenyl⟩ | —N(CH₃)(CH₃) | 443 | 0.76 |
| 31 | H₅C₂OOC—⟨phenyl⟩— | " | " | —N(CH₃)(CH₃) | 450 | 0.77 |
| 32 | (n)H₉C₄—⟨phenyl⟩—OOC—⟨phenyl⟩— | " | " | —N(CH₃)(C₂H₅) | 450 | 0.85 |
| 33 | (n)H₇C₃—⟨H⟩—⟨phenyl⟩— | " | " | —N(CH₃)(C₃H₇(n)) | 444 | 0.83 |
| 34 | (n)H₁₁C₅—⟨phenyl⟩—⟨phenyl⟩— | ⟨phenyl⟩ | ⟨phenyl⟩ | —N(CH₃)(C₂H₅) | 444 | 0.83 |
| 35 | (n)H₁₃C₆O—⟨phenyl⟩—⟨phenyl⟩— | " | " | —N(CH₃)(CH₂—⟨phenyl⟩—C₄H₉(n)) | 444 | 0.83 |

TABLE 2-3

$R^1-C\equiv C-$ [A] $-N=N-$ [B] $-N=N-$ [C] $-N=N-$ [D] $-R^2$ (m = n = 1 in general formula [I])

| No. | R¹— | A | B | C | D | —R² | λmax (n.m.) | Order parameter (S) |
|---|---|---|---|---|---|---|---|---|
| 36 | (n)H₉C₄—⌬— | ⌬ | ⌬ | ⌬ | ⌬ | —N(C₂H₅)(C₂H₅) | 581 | 0.83 |
| 37 | H₅C₂—OOC—⌬— | ⌬ | ⌬ | naphthalene | ⌬ | —N(CH₃)(C₂H₅) | 582 | 0.85 |
| 38 | (n)H₁₁C₅— | " | " | " | 2,5-dimethylphenyl (CH₃) | —NH—CH₂—⌬—C₅H₁₁(n) | 562 | 0.82 |
| 39 | (n)H₁₁C₅—⌬— | ⌬ | naphthalene | naphthalene | ⌬ | —NH—CH₂—⌬—OC₄H₉(n) | 647 | 0.83 |

TABLE 2-3-continued $R^1-C\equiv C-\underset{A}{\bigcirc}-N=N-\underset{B}{\bigcirc}-N=N-\underset{C}{\bigcirc}-N=N-\underset{D}{\bigcirc}-R^2$ (m = n = 1 in general formula [II])

| No. | R¹— | A | B | C | D | —R² | λmax (n.m.) | Order parameter (S) |
|-----|-----|---|---|---|---|-----|-------------|---------------------|
| 40 | (n)H₇C₃—⌬— | —⌬— | naphthalene | naphthalene | —⌬— | —NH—C₅H₁₁(n) | 652 | 0.81 |
| 41 | (n)H₉C₄—⌬—COO—⌬— | —⌬— | naphthalene | tetrahydroquinoline | | C₇H₁₅(n) | 650 | 0.81 |
| 42 | (n)H₉C₄—H—OOC—⌬— | —⌬— | —⌬—F | —⌬—F | | —N(CH₃)—CH₂—⌬—C₇H₁₅(n) | 570 | 0.82 |

TABLE 2-4

$$R^1-C\equiv C-\boxed{A}-N=N-\boxed{B}-N=N-\boxed{D}-R^2$$

(m = 1, n = 0 in general formula [I])

| No. | R¹— | A | B | D | —R² | λmax (n.m.) | Order parameter (S) |
|---|---|---|---|---|---|---|---|
| 43 | (n)H₁₁C₅—⌬— | —⌬— | naphthalene | naphthalene | —N(H)—CH₂—⌬—C₄H₉(n) | 579 | 0.82 |
| 44 | (n)H₇C₃—⌬—⌬— | " | " | " | —N(H)—CH₂—⌬—OC₅H₁₁(n) | 582 | 0.83 |
| 45 | (n)H₁₁C₅—⌬—⌬— | " | " | " | —N(CH₃)—C₃H₇(n) | 585 | 0.80 |
| 46 | (n)H₇C₃—⌬(H)—⌬— | " | " | " | —N(CH₃)—CH₂—⌬—C₃H₇(n) | 583 | 0.81 |
| 47 | (n)H₁₅C₇—⌬(H)—⌬— | —⌬— | naphthalene | naphthalene | —N(CH₃)—CH₂—⌬—OC₇H₁₅(n) | 583 | 0.81 |

TABLE 2-4-continued $R^1-C\equiv C-\boxed{A}-N=N-\boxed{B}-N=N-\boxed{D}-R^2$ (m = 1, n = 0 in general formula [I])

| No. | R¹— | —R²— (A–B–D′) | —R² | λmax (n.m.) | Order parameter (S) |
|---|---|---|---|---|---|
| 48 | (n)H₁₇C₈–C₆H₄– | " | –NH–CH₂–C₆H₄–C₈H₁₇(n) | 579 | 0.83 |
| 49 | (n)H₇C₃O–C₆H₄– | " | –NH–CH₂–C₆H₄–OC₃H₇(n) | 579 | 0.81 |
| 50 | (n)H₁₅C₇–O–C₆H₄– | " | –NH–CH₂–C₆H₄–C₅H₁₁(n) | 579 | 0.81 |
| 51 | H₅C₂OOC–C₆H₄– | " | –NH–CH₂–C₆H₄–C₂H₅ | 580 | 0.83 |
| 52 | (n)H₁₇C₈OOC–C₆H₄– | 3-CH₃-C₆H₃–naphthyl–naphthyl– | –NH–CH₂–C₆H₄–C₇H₁₅(n) | 580 | 0.83 |

TABLE 2-4-continued $R^1-C\equiv C-\underset{A}{\bigcirc}-N=N-\underset{B}{\bigcirc}-N=N-\underset{D}{\bigcirc}-R^2$ (m = 1, n = 0 in general formula [I])

| No. | R¹— | —R² | λmax (n.m.) | Order parameter (S) |
|---|---|---|---|---|
| 53 | (n)H₁₁C₅–⟨phenyl⟩–OOC–⟨phenyl⟩– | –NH–CH₂–⟨phenyl–C₅H₁₁(n)⟩ | 590 | 0.83 |
| 54 | (n)H₁₇C₈–⟨phenyl⟩–OOC–⟨phenyl⟩– | " pyrrolidinyl | 593 | 0.83 |
| 55 | (n)H₁₃C₆O–⟨phenyl⟩–OOC–⟨phenyl⟩– | " morpholinyl | 593 | 0.83 |
| 56 | (n)H₉C₄–⟨cyclohexyl(H)⟩–OOC–⟨phenyl⟩– | " (naphthyl-naphthyl-phenyl) | 590 | 0.83 |
| 57 | (n)H₁₅C₇O–⟨phenyl⟩–⟨phenyl⟩– | –N(CH₃)(C₅H₁₁(n)) | 585 | 0.80 |

TABLE 2-4-continued (m = 1, n = 0 in general formula [I])

R¹—C≡C—[A]—N=N—[B]—N=N—[D]—R²

| No. | R¹— | —R² | λmax (n.m.) | Order parameter (S) |
|---|---|---|---|---|
| 58 | (n)H₇C₃—O—[ph]—[ph]— | —N(H)—CH₂—[ph]—C₃H₇(n) | 580 | 0.82 |
| 59 | (n)H₁₁C₅—[ph]—OCH₂—[ph]— | " | 582 | 0.82 |
| 60 | (n)H₁₇C₈O—[ph]—OCH₂—[ph]— | " | 582 | 0.82 |
| 61 | (n)H₁₅C₇—[H]—OCH₂—[ph]— | " | 582 | 0.83 |
| 62 | (n)H₁₅C₇— | —[ph(CH₃)]—[naphthyl]—[naphthyl]—N(H)—CH₂—[ph]—C₄H₉(n) | 575 | 0.80 |

TABLE 2-4-continued (m = 1, n = 0 in general formula [I])

| No. | $R^1-$ | A | B | D | $-R^2$ | λmax (n.m.) | Order parameter (S) |
|---|---|---|---|---|---|---|---|
| 63 | $H_5C_2OOC$—(biphenyl)— | phenyl | phenyl | cyclohexyl | $-NH-CH_2$—C$_6$H$_4$—$OC_3H_7(n)$ | 582 | 0.83 |
| 64 | $(n)H_{15}C_7$—OOC—(biphenyl)— | " | " | " | $-NH-C_6H_3(CH_3)-CH_2$—C$_6$H$_4$—$OC_5H_{11}(n)$ | 540 | 0.83 |
| 65 | $(n)H_7C_3$—C$_6$H$_4$—OOC—C$_6$H$_4$— | " | " | " | $-NH-C_6H_3(F)-CH_2$—C$_6$H$_4$—$C_3H_7(n)$ | 539 | 0.84 |
| 66 | $(n)H_{11}C_5O$—C$_6$H$_4$—OOC—C$_6$H$_4$— | " | " | " | $-NH-(naphthyl)-CH_2$—C$_6$H$_4$—$C_3H_7(n)$ | 590 | 0.84 |

TABLE 2-4-continued $R^1-C\equiv C-\underset{A}{\bigcirc}-N=N-\underset{B}{\bigcirc}-N=N-\underset{D}{\bigcirc}-R^2$ (m = 1, n = 0 in general formula [I])

| No. | R¹— | —A— | —B— | —D— | —R² | λmax (n.m.) | Order parameter (S) |
|---|---|---|---|---|---|---|---|
| 67 | (n)H₉C₄—⟨H⟩—COO— | ⟨biphenyl⟩ | ⟨naphthyl⟩ | ⟨naphthyl⟩ | —N(CH₃)(C₂H₅) | 595 | 0.82 |
| 68 | (n)H₁₅C₇—C(O)O—⟨⟩—⟨⟩— | ⟨⟩ | " | " | —N(H)—CH₂—⟨⟩—C₅H₁₁(n) | 570 | 0.78 |
| 69 | (n)H₉C₄—⟨⟩—C(O)O—⟨⟩— | ⟨⟩ | " | " | —N(H)—CH₂—⟨⟩—C₄H₉(n) | 574 | 0.78 |
| 70 | (n)H₁₇C₈O—⟨⟩—C(O)O—⟨⟩— | ⟨⟩-CH₃ | " | " | —N(H)—CH₂—⟨⟩—C₅H₁₁(n) | 535 | 0.78 |

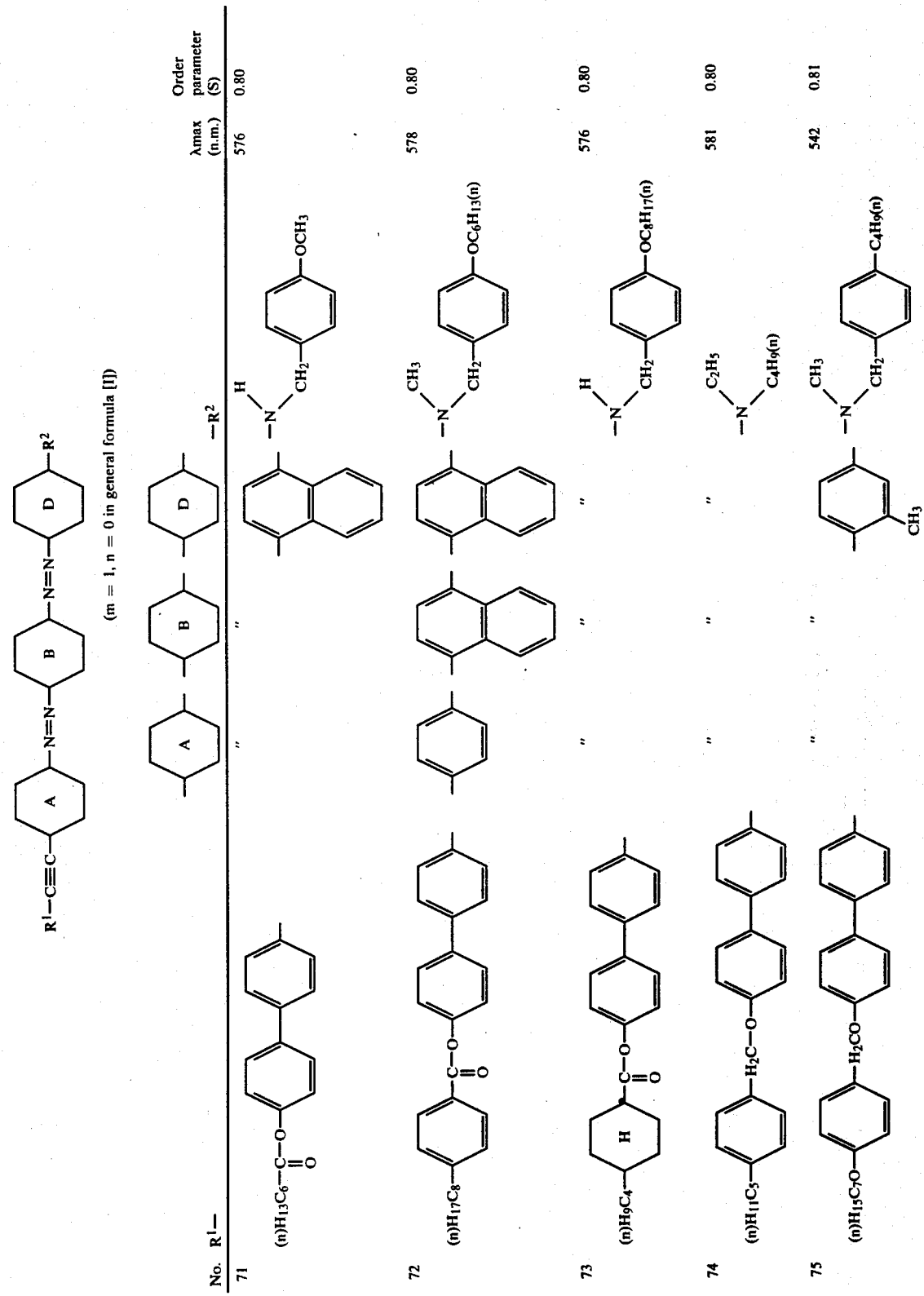

TABLE 2-4-continued (m = 1, n = 0 in general formula [I])

| No. | R¹— | A | B | D | —R² | λmax (n.m.) | Order parameter (S) |
|---|---|---|---|---|---|---|---|
| 76 | (n)H₉C₄–[H]–CH₂–O– | –[phenyl]–[phenyl]– | –[phenyl]– | –[2-F-phenyl]– | –NH–CH₂–[phenyl]–C₃H₇(n) (naphthalene linker) | 538 | 0.81 |
| 77 | (n)H₁₅C₇–[H]–C(=O)–O– | –[phenyl]– | " | –[2-methylphenyl]– | –NH–CH₂–[phenyl]–C₄H₉(n) | 575 | 0.79 |
| 78 | (n)H₁₃C₆O–[phenyl]–[phenyl]–C(=O)–O– | –[phenyl]– | " | –[naphthalene]– | –NH–CH₂–[phenyl]–C₇H₁₅(n) | 595 | 0.81 |
| 79 | (n)H₉C₄–[phenyl]–[phenyl]–C(=O)–O– | –[phenyl]– | –[naphthalene]– | –[2-methylphenyl]– | –NH–CH₂–[phenyl]–C₃H₇(n) | 545 | 0.79 |

TABLE 2-4-continued $R^1-C\equiv C-\underset{A}{\bigcirc}-N=N-\underset{B}{\bigcirc}-N=N-\underset{D}{\bigcirc}-R^2$ (m = 1, n = 0 in general formula [I])

| No. | R¹— | A | B | D | —R² | λmax (n.m.) | Order parameter (S) |
|---|---|---|---|---|---|---|---|
| 80 | (n)H₁₁C₅–[cyclohexane H]–COO– | –phenyl–phenyl– | –naphthyl– | –phenyl(CH₃)– | –NH–CH₂–phenyl–C₈H₁₇(n) | 540 | 0.83 |
| 81 | (n)H₁₅C₇–[cyclohexane H]–C(=O)–O– | –phenyl–phenyl– | " | " | –NH–CH₂–phenyl–C₅H₁₁(n) | 542 | 0.79 |

While the invention has been described in detail and with reference to specific embodiments thereof, it will be apparent to one skilled in the art that various changes and modifications can be made therein without departing from the spirit and scope thereof.

What is claimed is:

1. An azo compound having a dichroism and being represented by the general formula (1):

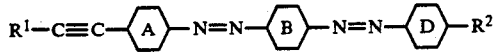
(I)

wherein
R¹ represents a 1-16 carbon alkyl group or

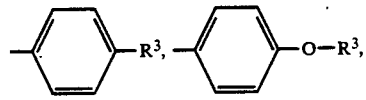

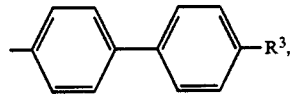

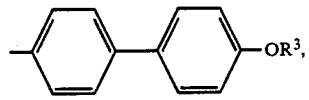

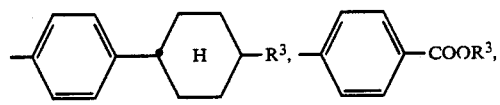

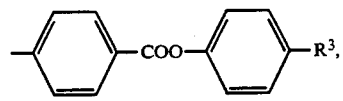

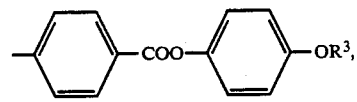

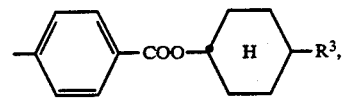

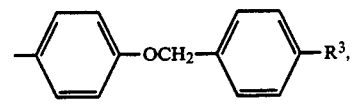

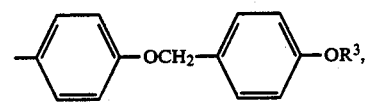

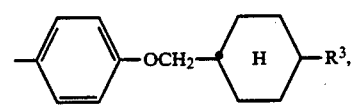

-continued

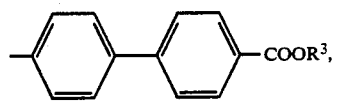

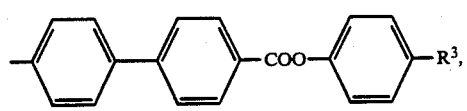

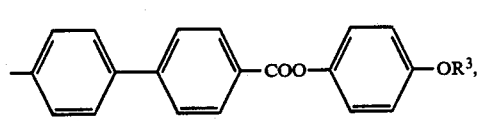

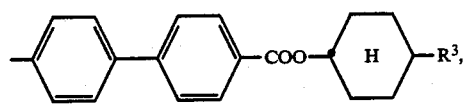

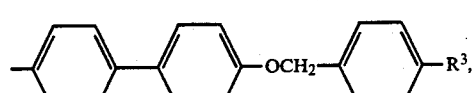

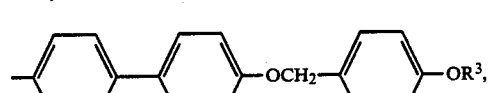

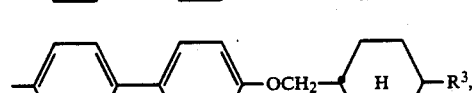

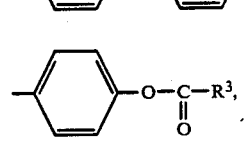

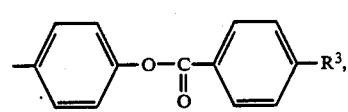

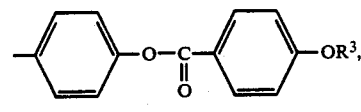

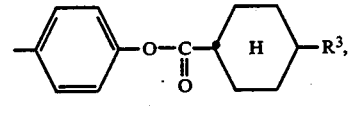

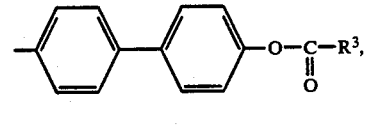

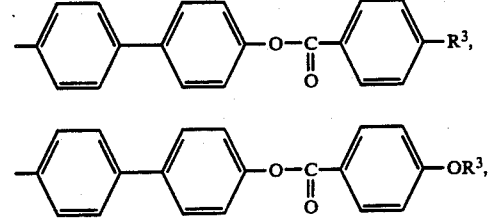

-continued or

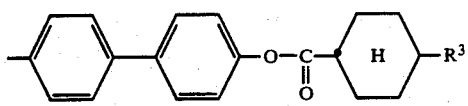

group (wherein R³ represents a 1-16 carbon alkyl group);

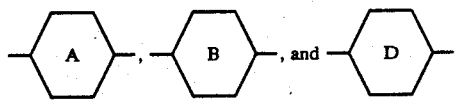

represent each a

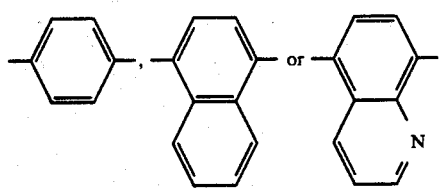

group optionally substituted with a lower alkyl group or a halogen atom;
R² represents a —OR³,

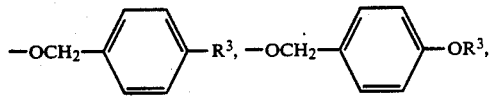

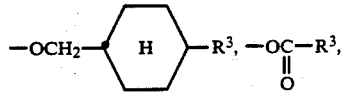

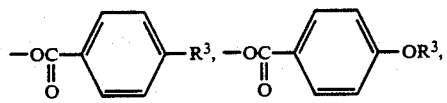

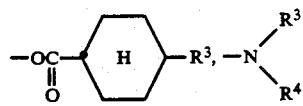

(wherein R³ is as defined above and R⁴ represents a hydrogen atom or a 1-16 carbon alkyl group),

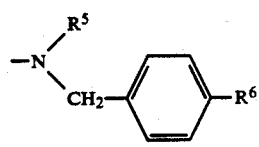

(wherein R⁵ represents a hydrogen atom or a 1-16 carbon alkyl group and R⁶ represents a hydrogen atom or a 1-16 carbon alkyl or a 1-10 carbon alkoxy group),

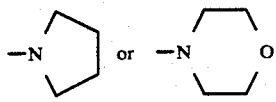

group; and a lower alkyl substituent in

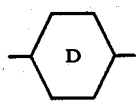

may bond to an alkyl group R³, R⁴ or R⁵ in

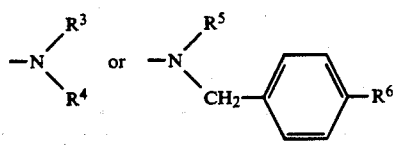

of the R² group to thereby form a nitrogen-containing aliphatic ring.

2. The azo compound of claim 1, wherein

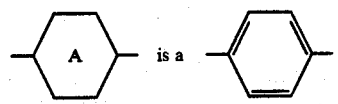

group optionally substituted with a lower alkyl group.

3. The azo compound of claim 1, wherein

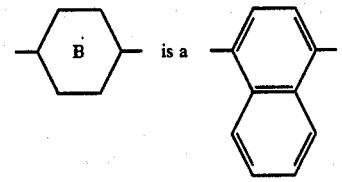

group or a

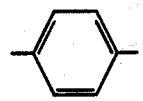

group optionally substituted with a lower alkyl group.

4. The azo compound of claim 1, wherein

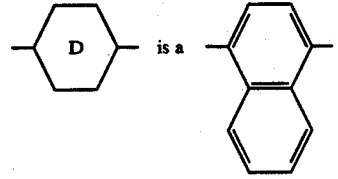

group, a

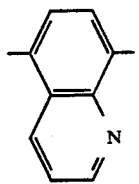

group or a

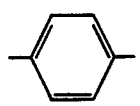

group optionally substituted with a lower alkyl group.

5. The azo compound of claim 1, wherein $R^1$ is a 1-16 carbon alkyl,

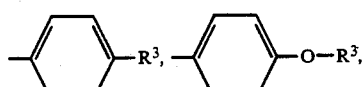

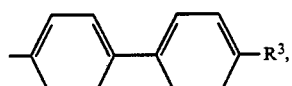

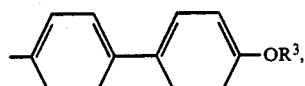

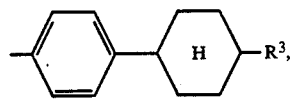

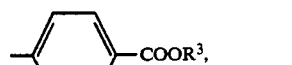

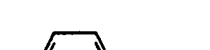

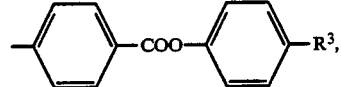

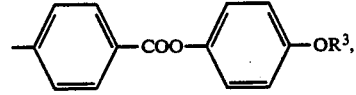

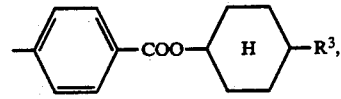

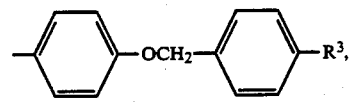

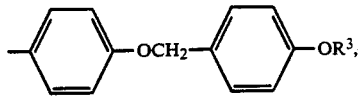

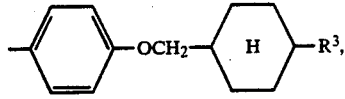

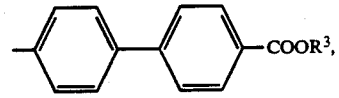

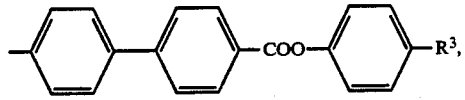

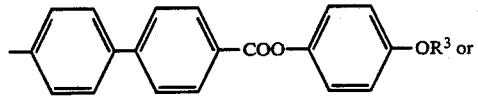

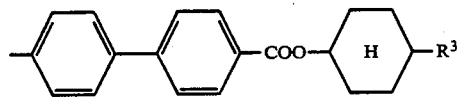

group (wherein $R^3$ is a 1-16 carbon alkyl group).

6. The azo compound of claim 1, wherein $R^2$ is

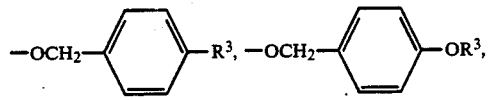

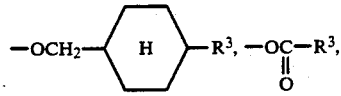

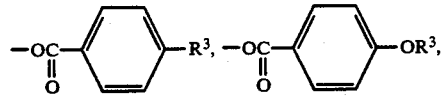

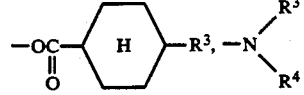

(wherein $R^3$ and $R^4$ represents each a 1-16 carbon alkyl group) or

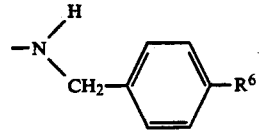

(wherein $R^6$ represents a hydrogen atom or a 1-16 carbon alkyl or a 1-10 carbon alkoxy group).

7. The azo compound of claim 1, wherein

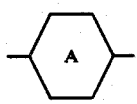

represents a

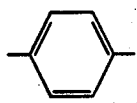

group optionally substituted with a lower alkyl group;

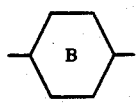

represents

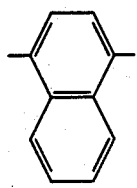

group or a

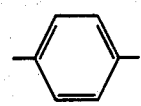

group optionally substituted with an alkyl group;

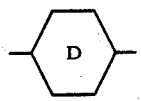

represents a

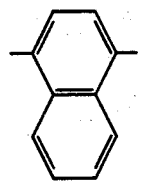

group, a

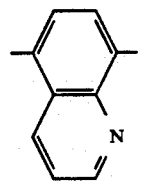 group or a 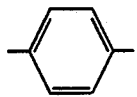

group optionally substituted with a lower alkyl group; $R^1$ represents an alkyl,

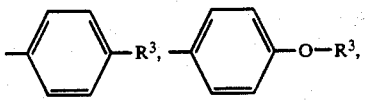

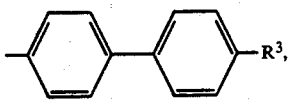

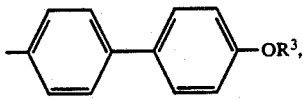

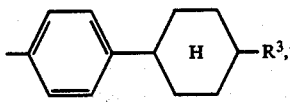

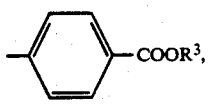

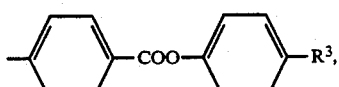

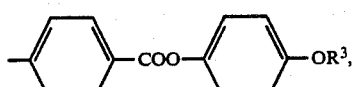

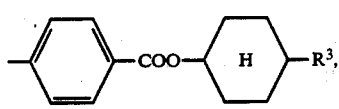

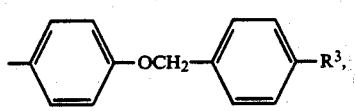

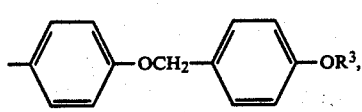

or 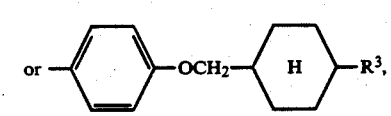

group (wherein $R^3$ represents a 1-16 carbon alkyl group); $R^2$ represents an

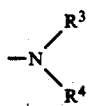

(wherein $R^3$ and $R^4$ represent each a $C_{1-16}$ alkyl group) or

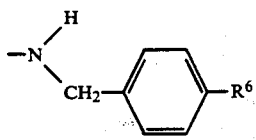

group (wherein R⁶ represents a hydrogen atom or a 1-16 carbon alkyl or a 1-10 carbon alkoxy group).

8. The azo compound of claim 7, wherein

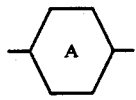

represents a

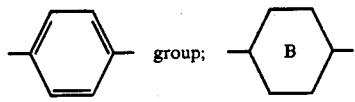

represents a

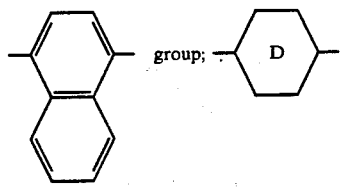

represents a

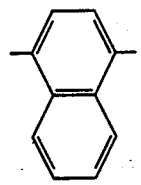

group or a

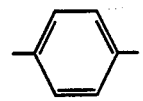

group optionally substituted with a lower alkyl group; R¹ represents a

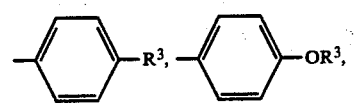

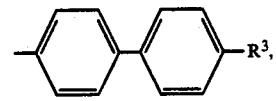

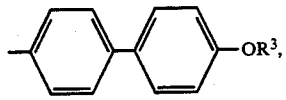

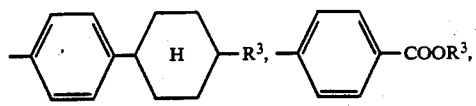

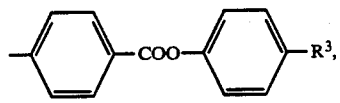

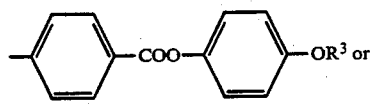

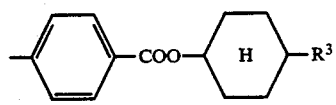

group (wherein R³ represents a 1-16 carbon alkyl group); R² represents an

(wherein R³ and R⁴ represent each a C₁₋₁₆ alkyl group) or

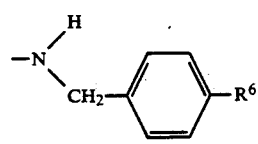

group (wherein R⁶ represents or a 1-16 carbon alkyl or a 1-10 carbon alkoxy group).

9. The compound of claim 1, wherein

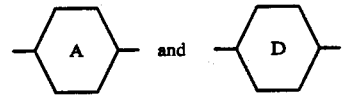

represent each a

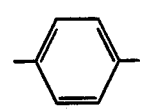

group; R¹ represents a

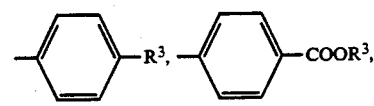

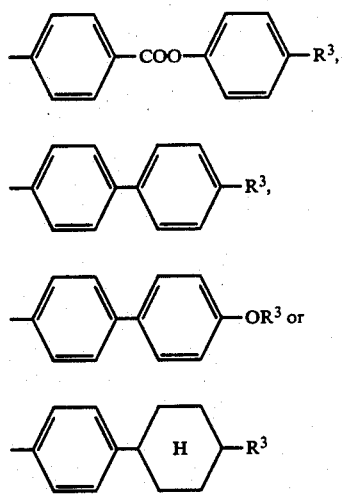

group (wherein R³ represents a 1-16 carbon alkyl group); and R² represents an

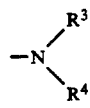

group (wherein R³ and R⁴ represent each a 1-16 carbon group) or a

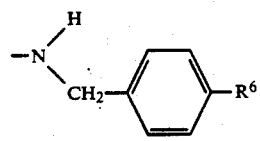

group (wherein R⁶ represents a 1-16 carbon alkyl group).

10. A liquid crystal composition comprising a liquid crystal and the azo compound of claim 1.

11. The composition of claim 10, wherein the liquid crystal is nematic.

12. The composition of claim 10, wherein the liquid crystal is cholesteric.

13. The composition of claim 10, wherein the liquid crystal is smectic.

14. An azo compound having a dichroism and being represented by the general formula (II):

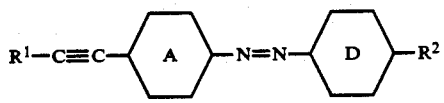

[II]

wherein
R¹ represents a 1-16 carbon alkyl group or a

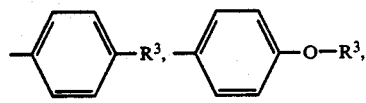

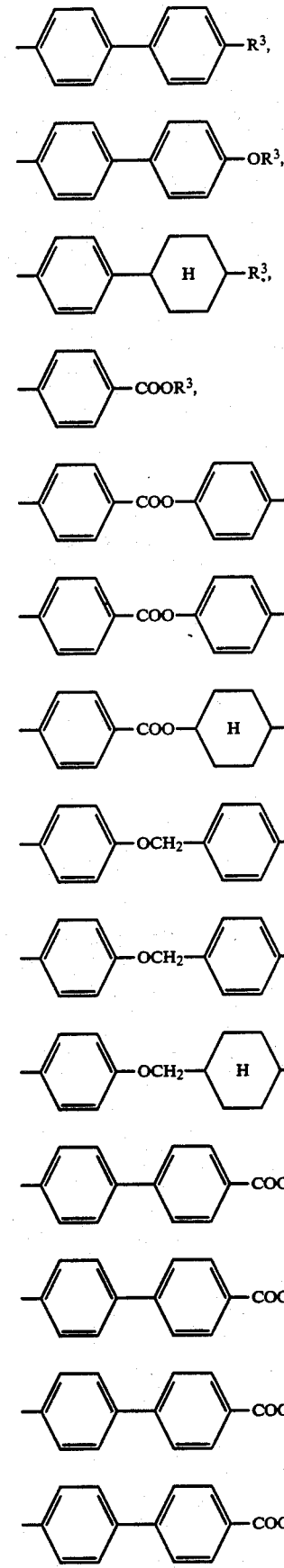

-continued

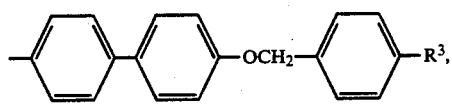

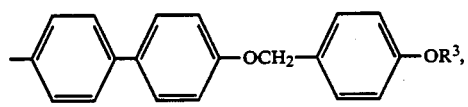

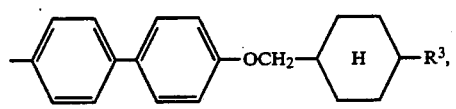

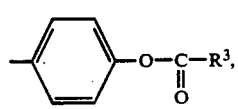

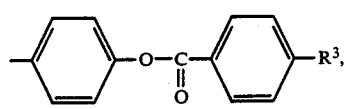

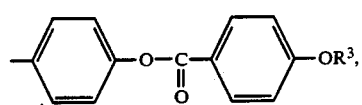

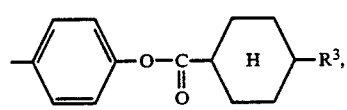

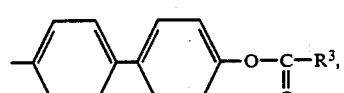

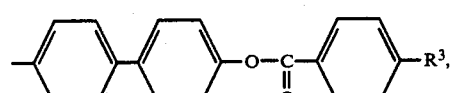

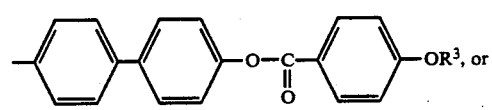

-continued

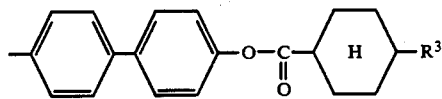

group (wherein $R^3$ represents an alkyl group);

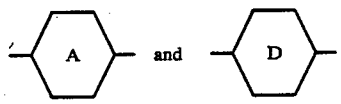

represent each a

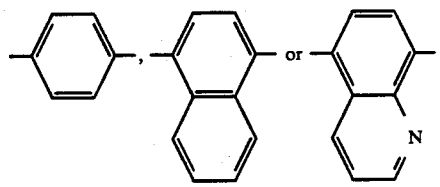

group optionally substituted with an alkyl group or halogen atom;

$R^2$ represents an

group (wherein $R^3$ and $R^4$ represent each a 1-16 carbon alkyl group) or a

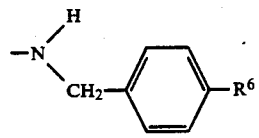

group (wherein $R^6$ represents a hydrogen atom or a 1-16 carbon alkyl or a 1-10 carbon alkoxy group).

15. A liquid crystal composition comprising a liquid crystal and the azo compound of claim 14.

16. The composition of claim 15, wherein the liquid crystal is nematic.

17. The composition of claim 15, wherein the liquid crystal is cholesteric.

18. The composition of claim 15, wherein the liquid crystal is smectic.

* * * * *